July 13, 1965 J. W. WEISE ETAL 3,194,853
SETTING OF MACHINE BASES
Filed Dec. 4, 1962 3 Sheets-Sheet 1
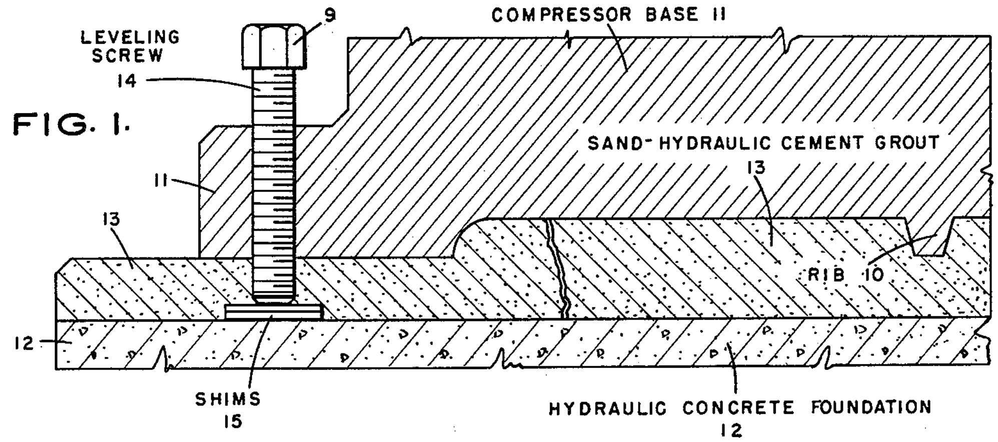
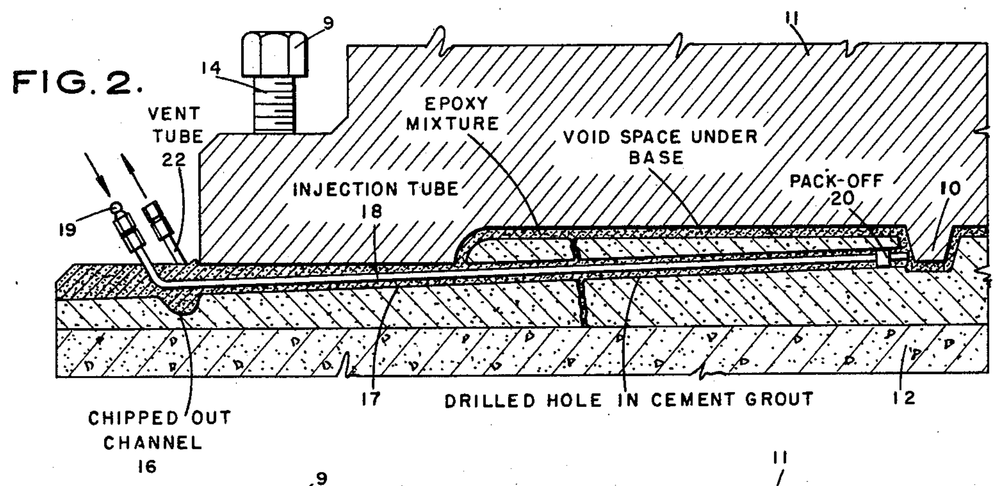
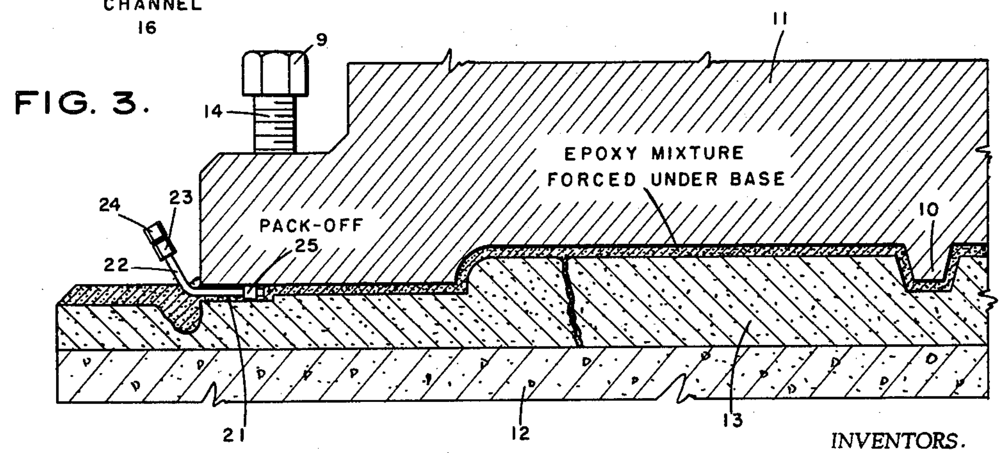
INVENTORS.
JESSE W. WEISE,
DAVID E. GALLOWAY,
BY
ATTORNEY July 13, 1965 J. W. WEISE ETAL 3,194,853
SETTING OF MACHINE BASES
Filed Dec. 4, 1962 3 Sheets-Sheet 2
FIG. 4.
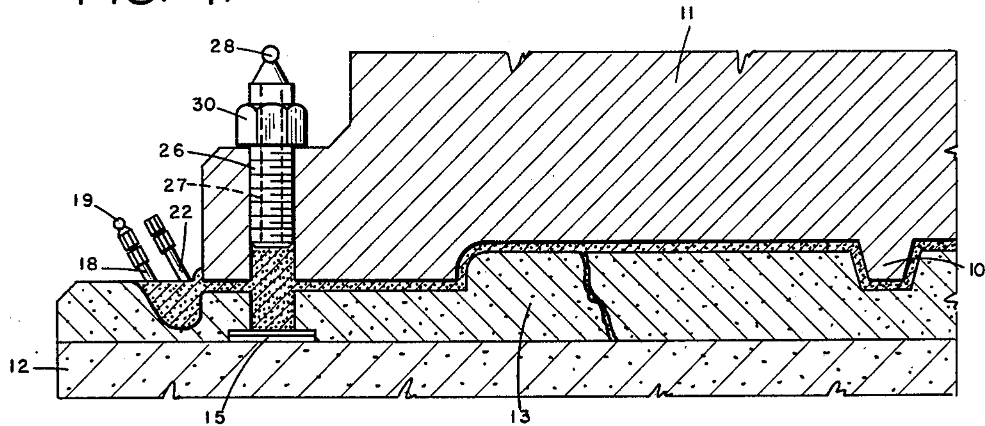
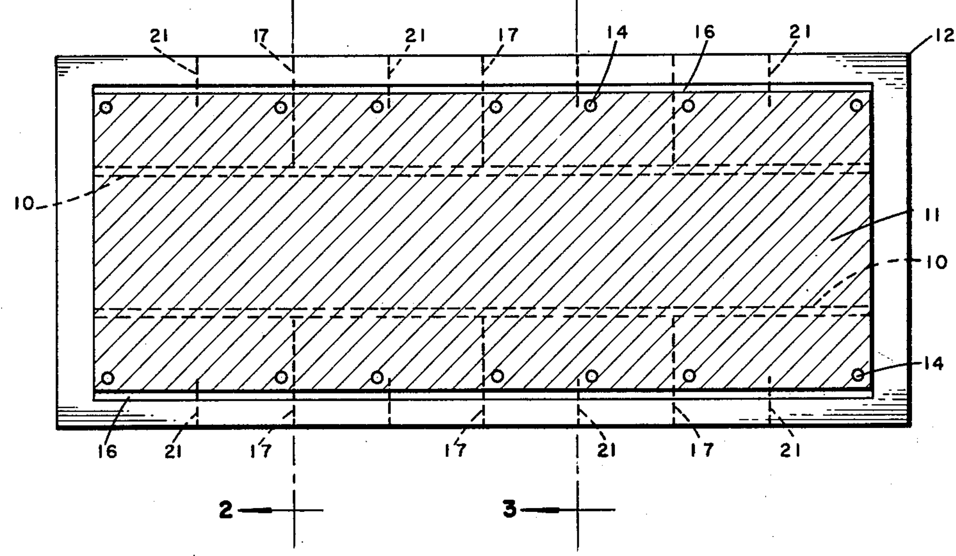
FIG. 5.
INVENTORS.
JESSE W. WEISE,
DAVID E. GALLOWAY,

SETTING OF MACHINE BASES

Filed Dec. 4, 1962 3 Sheets-Sheet 3

INVENTORS.
JESSE W. WEISE,
DAVID E. GALLOWAY,

BY

ATTORNEY.

United States Patent Office 3,194,853

Patented July 13, 1965

1

3,194,853

SETTING OF MACHINE BASES

Jesse W. Weise and David E. Galloway, Corpus Christi, Tex., assignors, by mesne assignments, to Esso Production Research Company, Houston, Tex., a corporation of Delaware Filed Dec. 4, 1962, Ser. No. 242,242

21 Claims. (Cl. 264—36)

The present invention is directed to setting of bases for machines. More particularly, the invention is concerned with treating grout used with a concrete foundation. In its more specific aspects, the invention is concerned with treating hydraulic cement grout arranged between a hydraulic concrete base and the metal base of a machine.

The present invention may be briefly described as a method for treating hydraulic cement grout wherein the grout is arranged between a hydraulic concrete base and the metal base of a machine which comprises injecting into the grout a liquid epoxy resin containing a hardening agent under a sufficient pressure to force the epoxy resin into any cracks, gaps, spaces or voids in the grout under the machine base. Thereafter, the epoxy resin is cured for a sufficient period of time to harden same before the operation of the machine is resumed.

In its broader aspects, the invention is concerned with setting a machine base on a foundation and then injecting a curable epoxy resin between the base and foundation and curing the epoxy resin whereby the machine is firmly set.

The epoxy resin injected into the grout or under the machine base may be cured by maintaining the grout containing the epoxy resin at ambient temperatures which may range from about 60° F. to about 90° F. for a time within the range from about 24 hours to about 72 hours. The epoxy resin may also be cured by heating the resin to a temperature within the range from about 100° F. to about 300° F. for a time which may range from about 0.25 hour to about 10 hours or more. Preferably, a temperature within the range from about 150° F. to about 220° F. is employed for a time from about 0.5 hour to about 2.0 hours. The machine may suitably be a compressor, a pump, or other prime moving device which sets up vibration and which tends to cause the usual hydraulic cement grout to disintegrate or crack or become loosened such that cracks, voids, spaces, gaps, and the like are formed under the metal base in the grout.

In practicing the present invention, a plurality of horizontally spaced-apart holes may be drilled laterally around and under the machine base. A channel is also formed along the sides of the machine base which is filled with liquid epoxy resin containing a hardening agent to form a barrier around at least a portion of the machine base. The ends of the metal base may remain unsealed. Thereafter, there is injected into the spaced-apart holes clear liquid epoxy resin containing a hardening agent under sufficient pressure to force the epoxy resin into cracks, gaps, voids, or spaces in the grout until clear epoxy resin appears from under the metal base. Thereafter, the epoxy resin under the machine base and the epoxy resin in the channel are cured.

2

In new installations, the machine base may be leveled on the foundation and clear liquid epoxy resin injected between the base and foundation under sufficient pressure to fill any spaces or voids therebetween and the resin is then cured.

The epoxy resin employed in the practice of the present invention is suitably a liquid epoxy resin having a structural formula as follows:

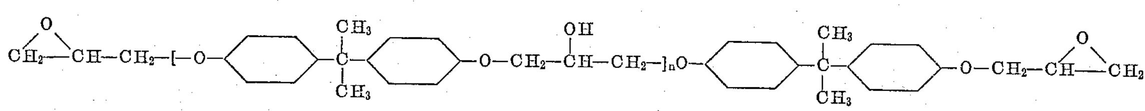

where $n$ is an integer having a value of 1 or which may be a greater number.

The liquid epoxy resin may be used as such or in a solvent therefor such as in butyl carbitol. The epoxy resin, when containing a catalytic hardening agent, will set up to a hard mass and will consolidate and strengthen hydraulic cement grouts. The epoxy resin is employed free of fillers, aggregates, and grits. In other words, the epoxy resin is clear and contains the hardening agent. The hardening agent employed may suitably be a liquid polyamide formed by reacting a fatty acid and an amine, or the hardening agent may be an amine such as diethyl amine, adduct of diethylene triamine and allyl glycidyl ether, metaphenylenediamine, phthalic anhydride, diethylaminopropylamine, and the like. Other hardening agents may be methylenedianiline, dicyandiamide, and the like. Other liquid epoxy resins which are available on the market and other hardening agents besides those illustrated may be used.

The present invention will be further illustrated by reference to the drawing in which:

FIG. 1 is a sectional view of a compressor arranged on a concrete foundation with a hydraulic cement grout;

FIG. 2 is a partial sectional view of a compressor arranged on a foundation at one stage of the treatment;

FIG. 3 is a similar view to FIG. 2 at another stage;

FIG. 4 is a view similar to FIG. 2 and 3 but illustrates another mode of injecting the epoxy resin;

FIG. 5 is a plan view illustrating the several injection points;

Figure 6:
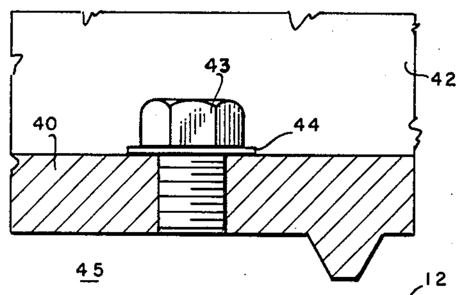
FIG. 6 is a partial sectional view of the base of a compressor illustrating another mode of the present invention.

Referring now to the drawing in which identical numerals will be employed to designate identical parts, numeral 11 designates a compressor or other machine base which is arranged on a hydraulic concrete foundation 12 and which is grouted with a body of hydraulic cement grout 13. Leveling screws or bolts 14 are used with shims 15 to level the compressor on machine base 11. The screws or bolts 14 are provided with hex nuts 9.

Referring now specifically to FIGS. 2 to 4, a channel 16 is formed by chipping out the grout to form channels around the sides of the base 11. Thereafter, a plurality of spaced-apart holes 17 are drilled on each side of the base 11 laterally into the grout 13, as shown more clearly in FIG. 5. Into these holes 17 are arranged tubes 18 provided with Alemite hydraulic fittings 19. The tubes 18 are provided with a seal 20 adjacent the end of the tubes in the holes 17 to prevent backflow of epoxy resin during injection. The holes 17 may be spaced equidistantly on the side of the compressor base having the greatest length at 0.25 distance at an angle which will intersect the first longitudinal rib, such as 10, of the compressor base.

Also arranged at horizontally spaced-apart points around the compressor base 11 are vents or grout holes 21 in which is arranged a tube 22 provided with a fitting 23 having a female connection 24. The tube 22 is provided with a seal 25 to prevent flow of epoxy resin around the tube.

Referring to FIG. 4, the leveling screw or bolt 14 is replaced by a screw or bolt 26 which is tapped to provide a passageway 27 and which terminates in an Alemite hydraulic fitting 28. The screw or bolt 26 is held on the compressor base by means of a hex nut 30.

In reference to FIGS. 6 to 9, inclusive, another mode of practicing the invention is described in which numeral 40 designates the base of a compressor 41 having a crankcase 42, the base 40 being drilled and threaded to receive a threaded screw 43. A washer 44 is arranged between screw 43 and the base 40. A space 45 between the base 40 and the foundation 12 is filled, as will be described, with clear epoxy resin.

Figure 7:
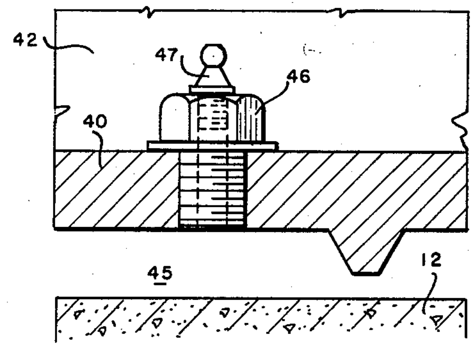
FIG. 7 is a modification of FIG. 6.

As shown in FIG. 7, a threaded screw 46 is drilled and tapped to receive an Alemite hydraulic fitting 47 for injection of clear epoxy resin into the space 45 in a manner described with respect to the other figures of the drawing.

Figure 8:
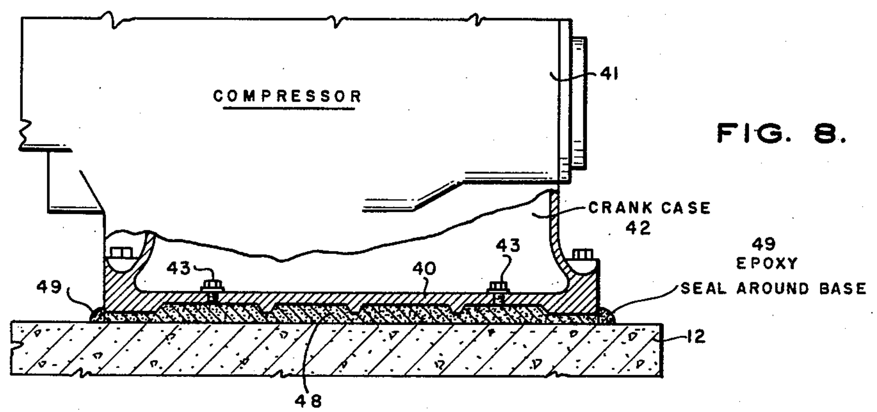
FIG. 8 is a partial sectional view of the compressor of FIGS. 6 and 7.

FIG. 8 illustrates compressor 41 with base 40 on foundation 12, the space 45 being filled with clear epoxy resin 48 through fitting such as 47. It is to be noted that a seal or bead 49 of epoxy resin is formed around the compressor 41 prior to injecting the clear epoxy resin to fill the space 45. The bead or seal 49 may be formed a sufficient length of time prior to injection of the clear epoxy between the base 40 and foundation 46 for the bead 49 to cure and harden. A time of about 24 hours may be sufficient, but this time may vary, as has been described.

It is understood, of course, that the mode of injection described with reference to FIGS. 6 to 9, inclusive, may be conducted with the injection and vent tubes described with reference to FIGS. 1 to 5, inclusive, and also that the injection points formed by tapping the base 40 to receive the screws 43 or screws 46 and fittings 47 may be spaced as shown in FIG. 5. Thus, the injection and vent tubes may be used with this mode, or injection of the epoxy resin may be through the screw 43 and screw 46 and fitting 47, or through both the injection tubes and the several fittings as described.

In FIGS. 6 and 8, the showing represents the compressor before and after epoxy resin injection, whereas FIG. 7 illustrates the means which may be used for injection. It is understood, of course, that the fittings 47 may be allowed to remain in the crankcase 42 since a seal is effected by the epoxy resin contained therein on its hardening.

Figure 9:
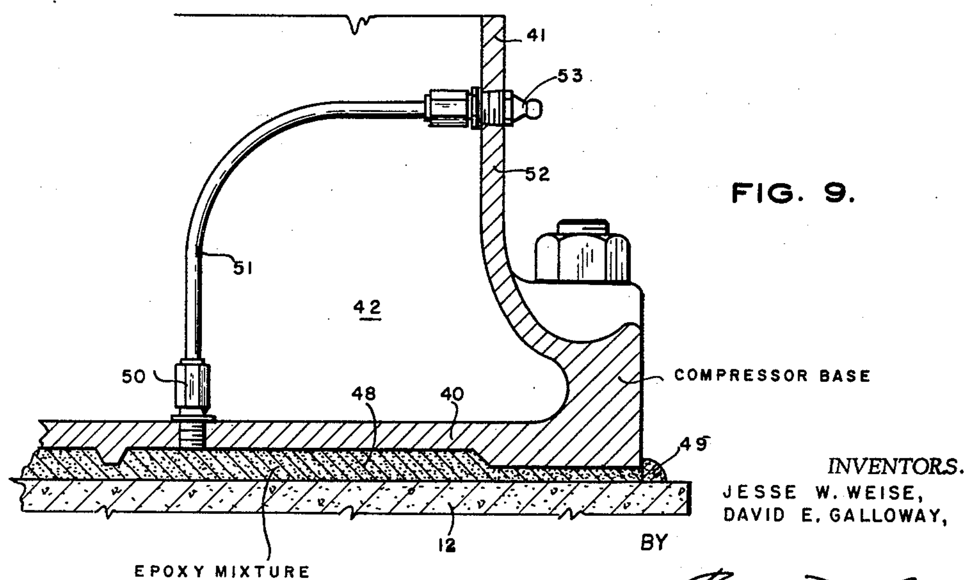
FIG. 9 is a further modification of FIGS. 6–8.

In FIG. 9, a fitting 50 replaces the screw 43 or screw 43 and fitting 47, to which is connected a tube 51 suitably constructed of steel or other material having sufficient strength extending through the wall 52 of the crankcase 42. The fitting 53 connected to tube 51 is an Alemite hydraulic fitting similar to fitting 47 through which clear epoxy resin 48 is injected into the space 45 by way of tube 51 and fitting 50.

While the present invention has been described in the several embodiments relative to a flat base engine or compressor, it is also applicable to engines or compressors with different shapes, such as those having a U-shaped pan. In this latter instance, the area around and beneath the pan may be blocked off or isolated by any desirable means prior to injection of clear epoxy resin.

In practicing the present invention as described with respect to the several figures of the drawing but particularly with respect to FIGS. 1 to 5, alignment and leveling of the compressor or other machine are suitably determined and foundation anchor bolts may be tightened. In a compressor such as a 10 GMV Cooper-Bessemer supercharged engine, three ½-inch diameter holes are drilled laterally into the grout beneath the metal base of the compressor spaced at ¼ point on both sides of the compressor at an angle that intersects the first longitudinal rib of the compressor base. These holes, with a compressor of this nature, having a base of approximately 5 feet by 18 feet, may extend to a depth of 16 inches. Four shallow ½-inch diameter holes extending for a depth of about 2 inches are drilled under the base spaced between the three deep holes on each side of the compressor base. Also, the leveling screws are suitably replaced by tapped screws or bolts, as shown more clearly in FIG. 4. The shallow holes may serve a dual purpose of vents during injection and as injection points, if needed. Inserted in all of the drilled holes, as shown in FIGS. 2, 3, and 4, are ³⁄₁₆-inch diameter capped tubings fitted with ⅛-inch Alemite hydraulic fittings. When the shallow holes serve as vents, the check valve part of the hydraulic fittings may be omitted. When clear epoxy resin appears through the vents, the check valve is then attached. A small trench or channel is chipped or otherwise formed along the sides of the compressor in the grout 13, as shown clearly in FIGS. 2, 3, and 4. This channel is suitably filled with liquid epoxy resin containing a hardening agent to form a barrier. A screw or bolt, such as shown in FIG. 4, tapped for a ⅛-inch Alemite hydraulic fitting is then installed in a leveling screw hole nearest the center of the compressor base. Thereafter, liquid epoxy resin is injected in any one or more of the deep holes drilled at the center and one side of the compressor base using a suitable injection device, such as a hand-operated grease gun, to inject the epoxy resin containing the hardening agent until considerable backpressure is developed, which may be as much as 2,000 p.s.i.g. The injection pressure is sufficient to overcome friction within the injection gun, hose, and connections, and in the immediate area of the injection tube end. The injection is continued, moving gradually outwardly along all of the fittings thereby forcing out through the vents any oil and air under the machine base or in the grout until finally clean epoxy resin appears from under the metal base. The epoxy resin has the property of being oil resistant and thus any oil under the metal base is displaced thereby. The procedure is repeated until only clear epoxy resin is seen around the base of the compressor. Thereafter, the ends of the tubings may be cut and covered with liquid epoxy resin containing the hardening agent. The epoxy resin in the grout is then allowed to cure for about 48 hours before resuming operation of the compressor or any other machine.

A similar procedure is used with respect to FIGS. 6 to 9 as has been described with respect thereto. In this instance, no grout is employed and a different injection mode is described.

The employment of pressure is important in the present invention. By injecting the epoxy resin under pressure, effective treating of the machine base and grout is obtained. Thus, fine cracks and spaces are filled and sealed. Hairline cracks in the grout, which may not be perceptible, are effectively filled with the pressure-injected epoxy resin. Without the use of pressure, a strong bond with the underside of the metal machine base may not be obtained. Oil and/or air under the machine base, otherwise, may not be removed. In fact, in one instance where epoxy resin was employed without the use of pressure, it was observed that a satisfactory treat was not achieved in that air bubbles remained trapped under the machine base.

Moreover, it is important that the barrier be formed, preferably only on the sides of the machine base such that oil and air under the machine base may be forced out or displaced by the epoxy resin at the ends of the machine base. To force the oil and/or air out from under the base, a way of egress therefor is needed in that the clearances, cracks, crevices, voids, spaces, and the like containing such oil and/or air may be relatively small and the ends of the base which remain open provide a ready passage outwardly for such oil and/or air. While the open tubes may provide a way of egress, a larger avenue may be required, which the open ends provide.

The present invention is applicable to new as well as old installations. In new installations, the machine may be placed on the leveling bolts extending from a foundation such as a concrete base and then suitably leveled using shims or other leveling means, as may be required. Thereafter, clear liquid epoxy resin is injected between the base and foundation under sufficient pressure to fill any spaces or voids existing therebetween. Setting of machines in this fashion may be accomplished either with a grout or without a grout between the machine base and foundation. Where a grout is not present, the injected epoxy resin on hardening, in effect, forms a grout under the machine base.

The present invention allows the setting of machines and the treatment of existing grout without requiring that the machine or the grout be removed. Heretofore, where grout had become damaged due to vibration, etc., it has been necessary to jack up the machine and remove and replace the damaged grout. This is avoided and is unnecessary in the present invention.

After the epoxy resin has been injected either under the base, where no grout is present, or into the grout, the temperature of the crankcase oil of the compressor or other machine may suitably be raised to a temperature sufficiently high to heat the epoxy resin to a temperature within the range indicated to cure the epoxy resin over a shortened period of time, as has been indicated. Otherwise, the epoxy resin may be allowed to stand, preferably for about 48 to about 72 hours, at a temperature preferably from about 70° F. to about 80° F.

Pressures employed in injecting the epoxy resin under the machine base or into the voids, gaps, cracks or spaces in the grout or between the grout and the machine base or the foundation may range from about 100 to about 2,000 p.s.i. It may be desirable to control the injection pressure since the usual crankcase is not designed for excessive pressures. Therefore, the pressure employed for injection should be designed for injection of epoxy resin beneath the compressor base without damaging the crankcase. The amount of epoxy resin employed varies with the size of the engine, and for engines within the range of 1,000 to 1,500 H.P., about 6 to about 12 gallons of liquid epoxy resin may be required. Grout under an engine of 1,350 H.P. may be suitably treated with these amounts of epoxy resin.

The present invention is quite advantageous and useful in that downtime of compressors or machines may be reduced by approximately 60% and costs reduced by approximately 90%. Heretofore, it had not been appreciated that hydraulic cements, such as Portland cement, could be treated by injecting into the grout epoxy resins containing a hardening agent to cause grout to be strengthened for extended and continuous use under machines such as compressors.

While the present invention is particularly applicable to treatment of hydraulic cement grout, such as Portland cement grout, it is also applicable to treatment of other cement grouts under machine bases and the like. Such other cement grouts may include, by way of illustration and not by limitation, epoxy grouts either with or without aggregates and/or fillers, other organic cementitious materials, and the like. Generally speaking, the present invention is applicable to treatment of any grout which has become damaged or ineffective due to formation of voids, cracks, fractures, or spaces therein.

The nature and objects of the present invention having been completely described and illustrated and the best mode thereof set forth, what we wish to claim as new and useful and secure by Letters Patent is:

1. A method of treating cement grout wherein the grout is arranged between a foundation and the base of a machine while maintaining said base and grout in place which comprises injecting into said grout under a pressure sufficient to fill any spaces, voids, cracks, or gaps in the grout a clear liquid epoxy resin containing a hardening agent and then curing said epoxy resin, whereby said grout into which said epoxy resin is injected and cured is capable of supporting said machine during operation.

2. A method in accordance with claim 1 in which the grout containing said epoxy resin is cured by maintaining same at ambient temperatures for about 24 hours to about 72 hours.

3. A method in accordance with claim 1 in which the epoxy resin is cured by heating same to a temperature within the range from about 100° F. to about 300° F. for a time within the range from about 0.25 hour to about 2.0 hours.

4. A method in accordance with claim 1 in which the machine is a compressor.

5. A method in accordance with claim 1 in which the grout is hydraulic cement.

6. A method in accordance with claim 1 in which the grout is an epoxy resin.

7. A method of treating hydraulic cement grout wherein the grout is arranged between a hydraulic concrete base and the base of a machine while maintaining said base and grout in place which comprises forming a barrier around at least a portion of said machine base with liquid epoxy resin containing a hardening agent, injecting into said grout under said machine base under a pressure sufficient to fill any spaces, voids, cracks, or gaps in the grout a clear liquid epoxy resin containing a hardening agent and then curing said epoxy resin in said grout and said epoxy resin around said machine base, whereby said grout into which said epoxy resin is injected and cured is capable of supporting said machine during operation.

8. A method of treating hydraulic cement grout wherein the grout is arranged between a hydraulic concrete base and the base of a machine while maintaining said base and grout in place which comprises forming a channel in said grout around at least a portion of said machine base, filling said channel with liquid epoxy resin containing a hardening agent to form a barrier at least around a portion of said machine base, injecting into said grout under said machine base under a pressure sufficient to fill any spaces, voids, cracks, or gaps in the grout a clear liquid epoxy resin containing a hardening agent and then curing said epoxy resin in said grout and said epoxy resin in said channel, whereby said grout into which said epoxy resin is injected and cured is capable of supporting said machine during operation.

9. A method of treating hydraulic cement grout wherein the grout is arranged between a hydraulic concrete base and the base of a machine while maintaining said base and grout in place which comprises drilling a plurality of horizontally spaced-apart holes laterally into said grout around and under said machine base, forming a channel in said grout around said machine base, filling said channel with liquid epoxy resin containing a hardening agent to form a barrier around said machine base, injecting into said horizontally spaced-apart holes under a pressure sufficient to fill any spaces, voids, cracks, or gaps in the grout a clear liquid epoxy resin containing a hardening agent until clear epoxy resin appears from under said machine base and then curing said epoxy resin in said grout and the epoxy resin in said channel, whereby said grout into which said epoxy resin is injected and cured is capable of supporting said machine during operation.

10. A method of treating hydraulic cement grout wherein the grout is arranged between a hydraulic concrete base and the base of a machine provided with leveling bolts while maintaining said base and grout in place which comprises forming at least a passageway into said grout under said machine base, injecting into said grout through said passageway under a pressure sufficient to fill any spaces, voids, cracks, or gaps in the grout a clear liquid epoxy resin containing a hardening agent and then curing said epoxy resin, whereby said grout into which said epoxy resin is injected and cured is capable of supporting said machine during operation.

11. A method in accordance with claim 10 in which the passageway is formed in said grout.

12. A method in accordance with claim 10 in which the passageway is formed by tapping a leveling bolt.

13. A method in accordance with claim 10 in which the passageway is formed by replacing a leveling bolt with a tapped bolt.

14. A method in accordance with claim 10 in which a plurality of passageways are formed with at least one passageway being in a tapped bolt and at least one passageway being in said grout.

15. A method of treating cement grout wherein the grout is arranged between a foundation and the base of a machine while maintaining said base and grout in place which comprises injecting into said grout under a pressure sufficient to fill any spaces, voids, cracks, or gaps in the grout a clear liquid epoxy-polyamide resin and then curing said epoxy-polyamide resin, whereby said grout is treated to make it suitable for operation of said machine.

16. A method in accordance with claim 15 in which the grout is hydraulic cement.

17. A method of setting a machine having a base which is adapted to be arranged on a foundation which comprises leveling said machine base on said foundation and then injecting a curable clear liquid epoxy resin under pressure to fill any spaces, voids, cracks, or gaps between said machine base and the foundation, whereby said machine is firmly set for subsequent operation.

18. A method in accordance with claim 17 in which a grout is arranged between the base and the foundation.

19. A method in accordance with claim 17 in which a barrier is formed around at least a portion of the machine base.

20. A method of repairing a cement which has become cracked by vibration of a machine supported by said cement while maintaining said cement and machine in place which comprises injecting into said cement a curable clear liquid epoxy resin under a pressure sufficient to fill cracks in said cement and then curing said resin, whereby said cement into which epoxy resin has been injected and cured is capable of supporting said machine during operation.

21. A method in accordance with claim 20 in which at least one hole is drilled in said cement into which said resin is injected.

References Cited by the Examiner

UNITED STATES PATENTS

| | | | |
|---|---|---|---|
| 676,128 | 6/01 | Goldie | 264—261 |
| 1,883,196 | 10/32 | Wertz | 264—36 |
| 1,953,452 | 4/34 | Wertz | 264—36 |
| 2,805,448 | 9/57 | Rubenstein | 264—274 |

OTHER REFERENCES

"Repair of Damaged Concrete With Epoxy Resins," by M. Levy, Journal of the American Concrete Institute, March 1961, pages 1187–1189.

"Those Amazing Epoxy Adhesives," by H. Luckett; Popular Science, July 1959, page 171.

ROBERT F. WHITE, *Primary Examiner*.

ALEXANDER H. BRODMERKEL, *Examiner*.